(12) United States Patent
Devis

(10) Patent No.: US 12,434,751 B2
(45) Date of Patent: Oct. 7, 2025

(54) COLLAPSIBLE CART AND METHOD OF USE THEREOF

(71) Applicant: David Devis, Downey, CA (US)

(72) Inventor: David Devis, Downey, CA (US)

(*) Notice: Subject to any disclaimer, the term of this patent is extended or adjusted under 35 U.S.C. 154(b) by 449 days.

(21) Appl. No.: 17/965,570

(22) Filed: Oct. 13, 2022

(65) Prior Publication Data

US 2023/0109900 A1 Apr. 13, 2023

Related U.S. Application Data

(60) Provisional application No. 63/255,395, filed on Oct. 13, 2021.

(51) Int. Cl.
*B62B 3/02* (2006.01)
(52) U.S. Cl.
CPC .................................... *B62B 3/022* (2013.01)
(58) Field of Classification Search
CPC ........... B62B 3/022; B62B 3/02; B62B 3/027; B62B 5/0003
See application file for complete search history.

(56) References Cited

U.S. PATENT DOCUMENTS

| 5,084,922 A * | 2/1992 | Louit ................... A61G 1/0293 |
| | | 296/20 |
| 9,211,899 B2 | 12/2015 | Beauchamp et al. |
| 9,643,628 B2 | 5/2017 | Herbault et al. |
| 10,112,634 B1 | 10/2018 | Davydov |
| 10,232,867 B1 * | 3/2019 | Jones ................... B62B 3/1404 |
| 10,864,932 B2 | 12/2020 | Darvish |
| 11,046,343 B2 | 6/2021 | Stroh |
| 2020/0223465 A1 | 7/2020 | Geffen et al. |

FOREIGN PATENT DOCUMENTS

KR 102166097 B1 10/2020

* cited by examiner

*Primary Examiner* — Bryan A Evans
(74) *Attorney, Agent, or Firm* — Innovent Law, P.C.; Karima Gulick

(57) ABSTRACT

A collapsible cart system, comprising: a container having a front end and a back end, a chassis coupled with a bottom of the container, at least one first leg having a first end movable relative to the chassis and a second end, at least one first wheel coupled with the second end of the first leg, and a first actuator connected to the chassis and the first leg. The first actuator is configured to move the first leg relative to the chassis to alternate between a first position where the second end the first leg is fully extended away from the chassis and a second position where the first leg is substantially parallel with a bottom of the chassis.

16 Claims, 5 Drawing Sheets

COLLAPSIBLE CART AND METHOD OF USE THEREOF

BACKGROUND OF THE INVENTION

1. Field of the Invention

This invention relates to a collapsible cart system generally, and particularly a collapsible shopping cart system with a chassis that collapses completely with telescoping legs capable of being loaded into a car, SUV, vehicle, and/or truck.

2. Description of the Related Art

While there are several personal shopping cart systems in the marketplace, no personal shopping cart devices feature height-adjustable legs and additional wheels for ease of transferring the shopping cart into the user's vehicle without the need to unload the cart itself. Though the most popular personal shopping carts do feature adjustable handles, the basket is fixed at a permanent height. Unloading a shopping cart much lower or much higher than one's vehicle can become cumbersome and result in items becoming damaged or injuring one's person. It would be desirable to have a personal shopping cart system that can be adjusted to the height of one's vehicle and easily pushed into one's vehicle cargo area. In addition, with the spread of pandemics, having a personal shopping cart which can be used for personal use and cleaned appropriately is desirable.

U.S. Pat. No. 10,112,634 to Davydov (2018) demonstrates the design for a collapsible shopping cart which utilizes a chassis and a single set of wheels on the basket itself for rolling the shopping cart into the user's vehicle. However, this design does not take into account the dissimilar heights of various vehicle cargo area and ultimately makes it difficult or potentially impossible for people with back or other health conditions to lift items into their vehicles.

Currently, there are no useful alternatives that effectively utilize a collapsible shopping cart with a chassis including telescoping legs and which can be loaded into a person's vehicle or on counters. As will be disclosed below, the present disclosure addresses these needs and covers a device and method of a collapsible shopping cart system and a method of use to prevent these inconveniences and solve these issues.

SUMMARY OF THE INVENTION

In one aspect, the present invention is a personal shopping cart system including a basket having a main storage compartment with a front face and a rear face directly opposite the front face distanced by the main storage compartment, wherein the basket is attached to a chassis, the chassis having a first plurality of legs wherein the first plurality of legs are collapsible and adjustable in height, and wherein the first plurality of legs have a top end and a bottom end, the top end of the first plurality of legs is rotatably coupled to the chassis, and the bottom end of the first plurality of legs is attached to a first set of wheels, a second plurality of legs, wherein the second plurality of legs are collapsible and adjustable in height, and wherein the second plurality of legs have a top end and a bottom end, the top end of the second plurality of legs is attached to a bumper, and the bottom end of the second plurality of legs is attached to a second set of wheels, a bearing having a first end and a second end, wherein the second end is rotatably attached to the chassis, and the bearing is operable to control the motion of the second plurality of legs, a first actuator having a first end and a second end, wherein the first end is attached to the first plurality of legs, the second end is attached to the chassis or the basket, and the actuator is operable move the first plurality of legs from an extended condition to a collapsed condition, a second actuator having a first end and a second end, wherein the first end is attached to the second plurality of legs, the second end is attached to the chassis or the basket, and the actuator is operable move the second plurality of legs from an extended condition to a collapsed condition, a handle securely mounted to the chassis, a first set of wheels and a second set of wheels securely coupled to the basket, wherein the first set of wheels and second set of wheels are operable to support the basket and chassis when the first plurality of legs and second plurality of legs are in a collapsed condition.

In addition, the cart system basket may further comprise a compartment adapted to structurally receive a baby seat.

The cart system may also include a removable cover that can be made from a variety of materials including fabric, plastics, neoprene, or any other suitable material.

In addition, the cart system basket may include at least one of a hook, a net, a modular divider, and one or more compartments that allow the main storage compartment to be subdivided into two or more compartments.

To aid in adjusting the height of the cart system, the first plurality of legs and the second plurality of legs may be telescopingly adapted for adjusting a height of the system.

To avoid accidental movement of the cart system, the first set of wheels and the second set of wheels may include a brake that can be set by a user.

The cart system may be operated by obtaining a collapsible shopping cart, expanding the collapsible shopping cart by expanding a collapsible shopping cart chassis and expanding a collapsible shopping cart legs, gripping the collapsible shopping cart by a handle, rolling the collapsible shopping cart, placing items into a basket of the collapsible shopping cart, rolling the collapsible shopping cart to a user's vehicle, adjusting a height of the collapsible shopping cart legs to a vehicle cargo area level, and pushing the collapsible shopping cart into the vehicle cargo area thereby activating a first set and second set of wheels to roll the collapsible shopping cart into the vehicle.

If so equipped, the method of using the cart system may also include the further step of activating a set of brakes on the second set of wheels to ensure that the cart does not roll inside the vehicle.

In one embodiment, the collapsible shopping cart system is for personal use such as for grocery shopping, or everyday shopping. In other embodiments, the collapsible shopping cart system comprises sturdy and rugged material adapted for construction and heavy material use and transportation, especially in commercial applications.

In another embodiment, the collapsible shopping cart system includes a compartment adapted to structurally receive a baby seat in the basket. The user can easily secure the baby seat by utilizing coupling means such as snapping, sliding, or using polyester or nylon seatbelt webbing to strap the baby seat into place.

In another embodiment, the collapsible shopping cart system further includes a light-weight, waterproof, washable removable cover to protect the collapsible shopping cart from damage in transport and between uses.

In another embodiment, the removable cover features luggage straps and a set of wheels at the base of the removable cover for ease of transporting the collapsible shopping cart while within the removable cover.

In one embodiment, the collapsible shopping cart system includes at least one hook, or other attachment device, and a means for compartmentalizing the main storage compartment. The material of the compartmentalizing means can be an elastic net, elastic mesh, or flexible and collapsible waterproof and thermally insulated material, all of which are washable. To compartmentalize the main storage compartment, the compartmentalizing means is connected to the attachment device thereby creating a new compartment within the main storage compartment.

In another embodiment, the collapsible shopping cart system includes a first set of wheels and a second set of wheels, the latter of which includes a brake. The first set of wheels are coupled to the basket to allow the collapsible shopping cart to be easily pushed into the cargo area of the user's vehicle. The material of the wheels can be made of plastic, rubber, or polyurethane.

In an alternative embodiment, the collapsible shopping cart system includes a plurality of legs that are telescoping adapted for adjusting a height of the system. This allows the cart height to be adjusted as required by user preference, or in the case of vehicle use, the height of the vehicle.

In addition, the chassis or the basket includes a bumper attached to at least one side of the chassis or the bumper, wherein the bumper is operable to absorb impacts with other objects.

The present disclosure is also embodied in a method of using a collapsible shopping cart system, including the steps of obtaining the system, expanding the chassis and shopping cart legs, gripping the system by the handle, rolling the system, placing items into the basket of the system, rolling the system to the user's vehicle, adjusting the system legs and pushing the system into the vehicle cargo area thereby activating a first set of wheels to roll the collapsible shopping cart into the vehicle. The method further includes the step of activating a set of brakes on the first set of wheels to ensure that the cart does not roll inside the vehicle.

Before explaining the various embodiments of the invention in detail, it is to be understood that the invention is not limited in its application to the details of construction and to the arrangements of the components set forth in the following description or illustrated in the drawings. Rather, the invention is capable of other embodiments and of being practiced and carried out in various ways. Also, it is to be understood that the terminology employed herein is for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

For a better understanding of the invention, its operating advantages and the specific objects attained by its uses, reference should be made to the accompanying drawings and descriptive matter in which there are illustrated preferred embodiments of the invention.

Various objects, features, aspects and advantages of the present embodiment will become more apparent from the following detailed description of embodiments of the embodiment, along with the accompanying drawings in which like numerals represent like components.

BRIEF DESCRIPTION OF THE DRAWINGS

It should be noted that the drawing figures may be in simplified form and might not be to precise scale.

The same elements or parts throughout the figures of the drawings are designated by the same reference characters, while equivalent elements bear a prime designation.

DETAILED DESCRIPTION OF THE INVENTION

The embodiment and various embodiments can now be better understood by turning to the following detailed description of the embodiments, which are presented as illustrated examples of the embodiment defined in the claims. It is expressly understood that the embodiment as defined by the claims may be broader than the illustrated embodiments described below. Many alterations and modifications may be made by those having ordinary skill in the art without departing from the spirit and scope of the embodiments.

Figure 1:
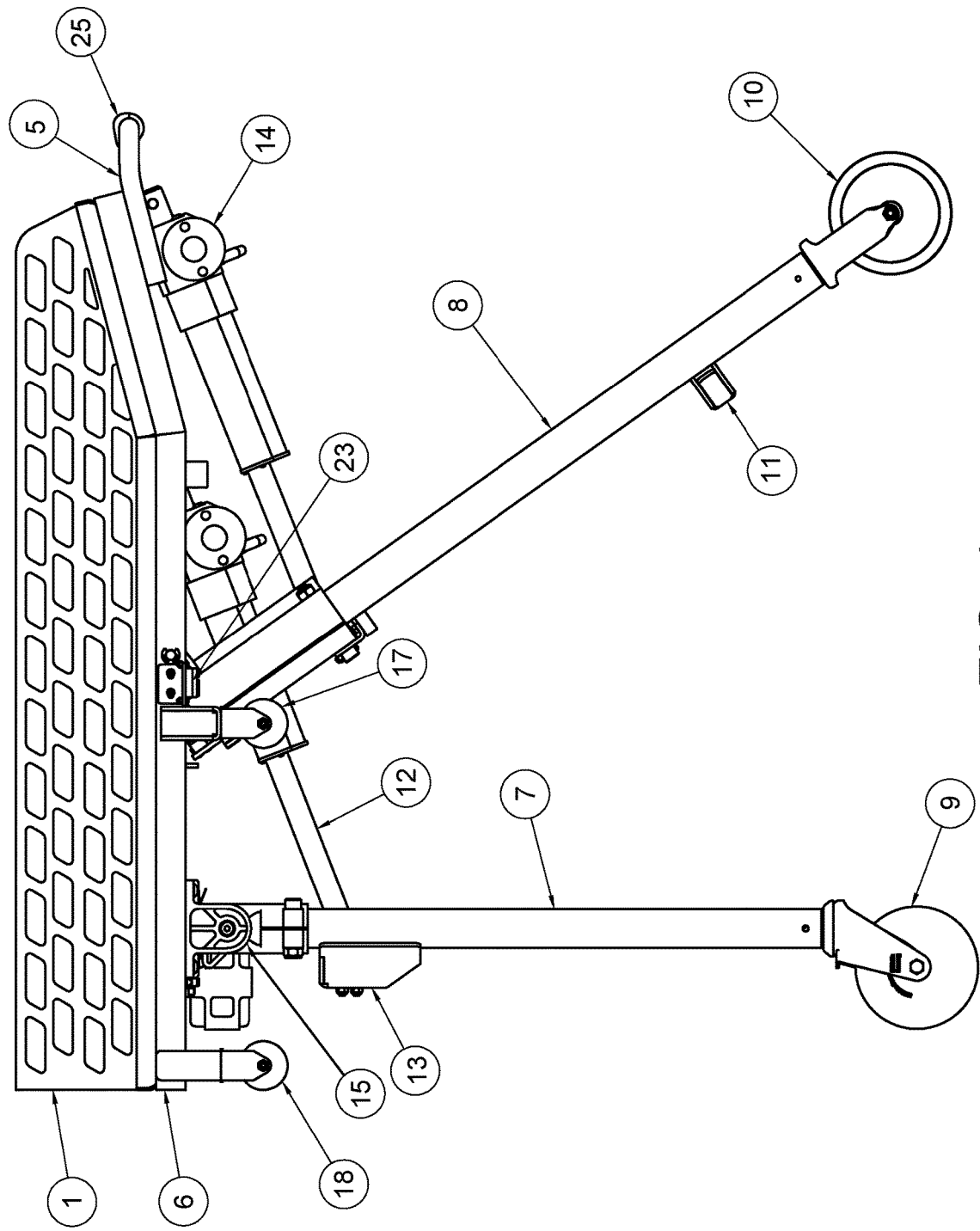
FIG. 1 is a side view of one embodiment of the present disclosure showing an extended version of the collapsible shopping cart.
Figure 2:
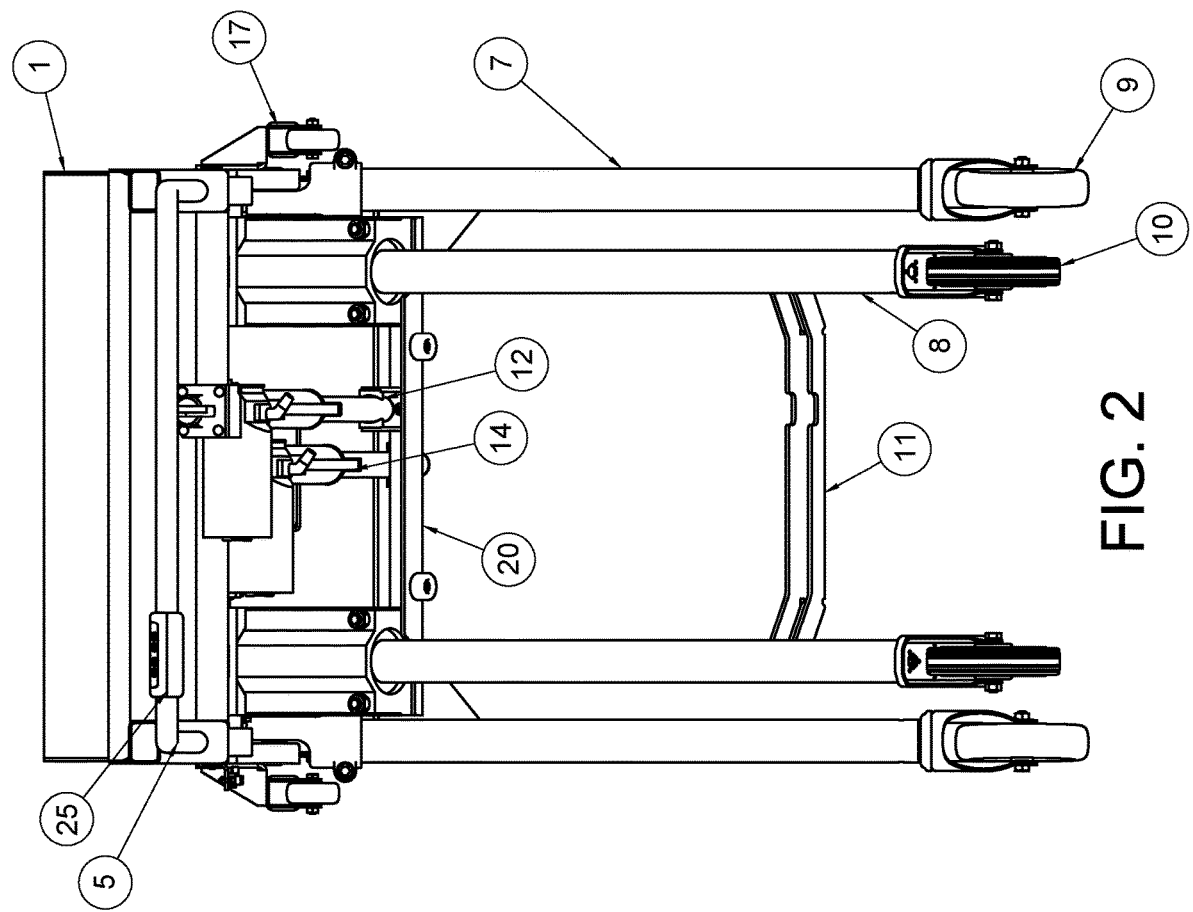
FIG. 2 is a front view of one embodiment of the present disclosure showing an extended version of the collapsible shopping cart.
Figure 3:
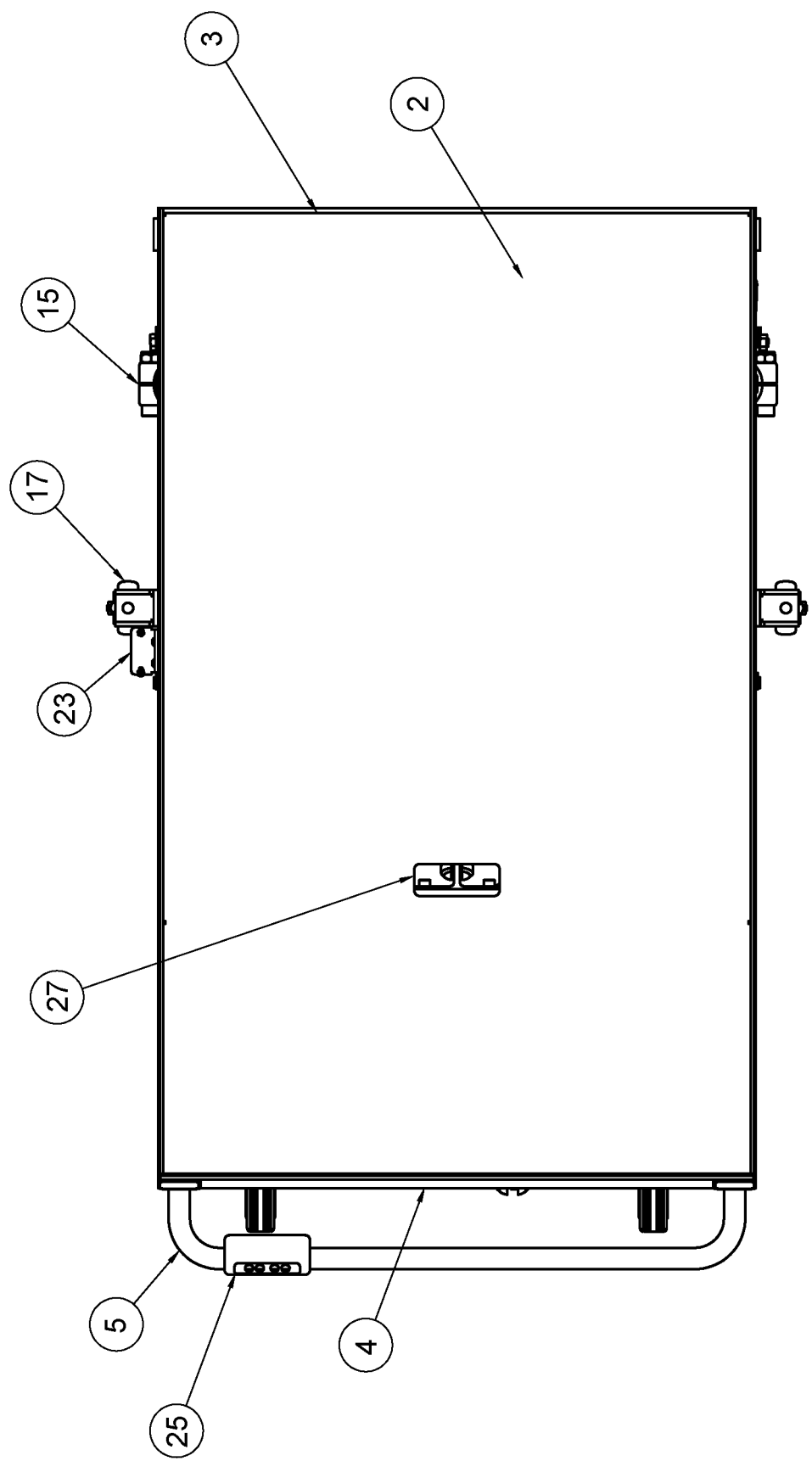
FIG. 3 is a top view of one embodiment of the present disclosure showing an extended version of the collapsible shopping cart.
Figure 4:
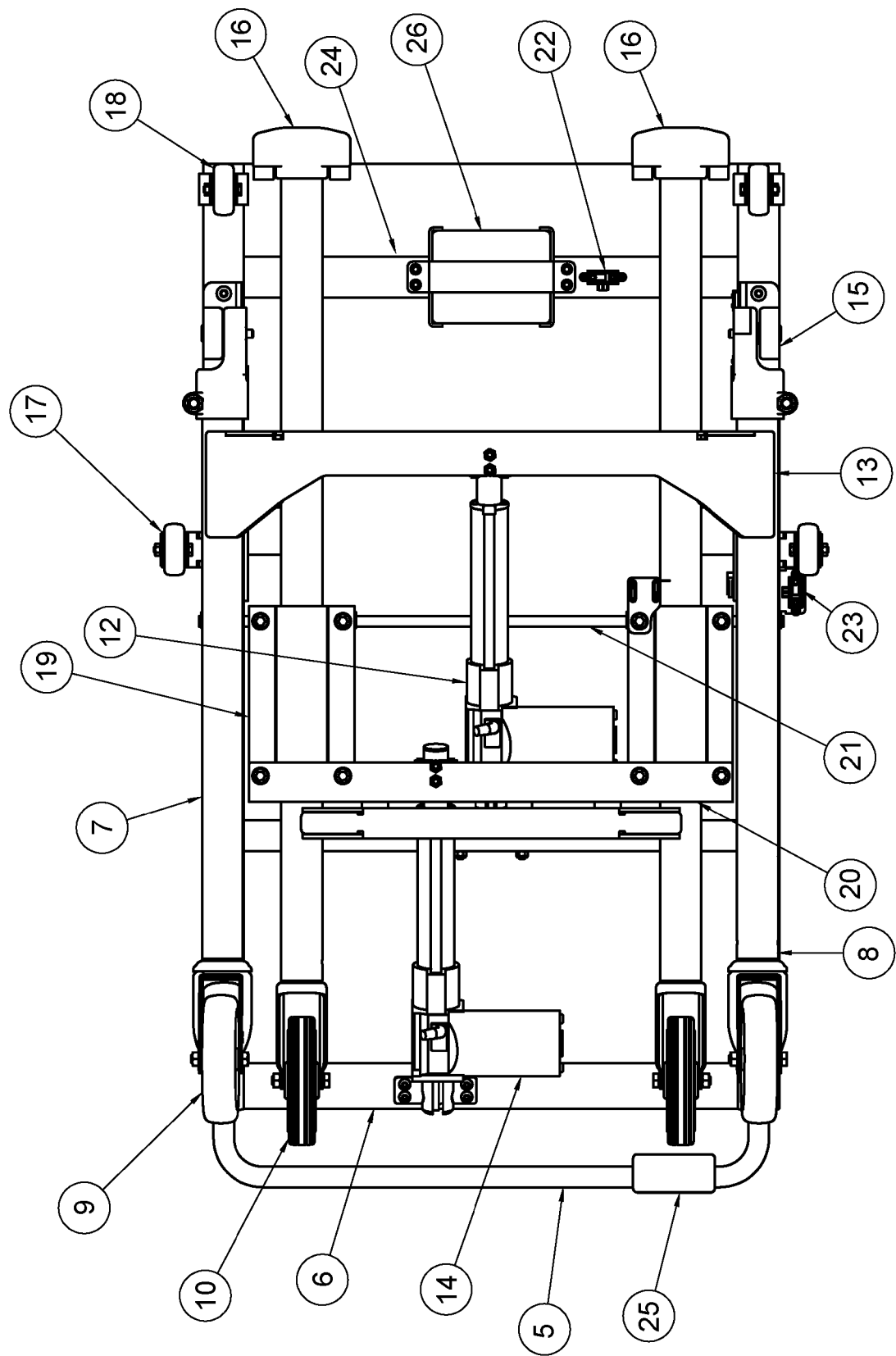
FIG. 4 is a bottom view of one embodiment of the present disclosure showing a collapsed version of the collapsible shopping cart.
Figure 5:
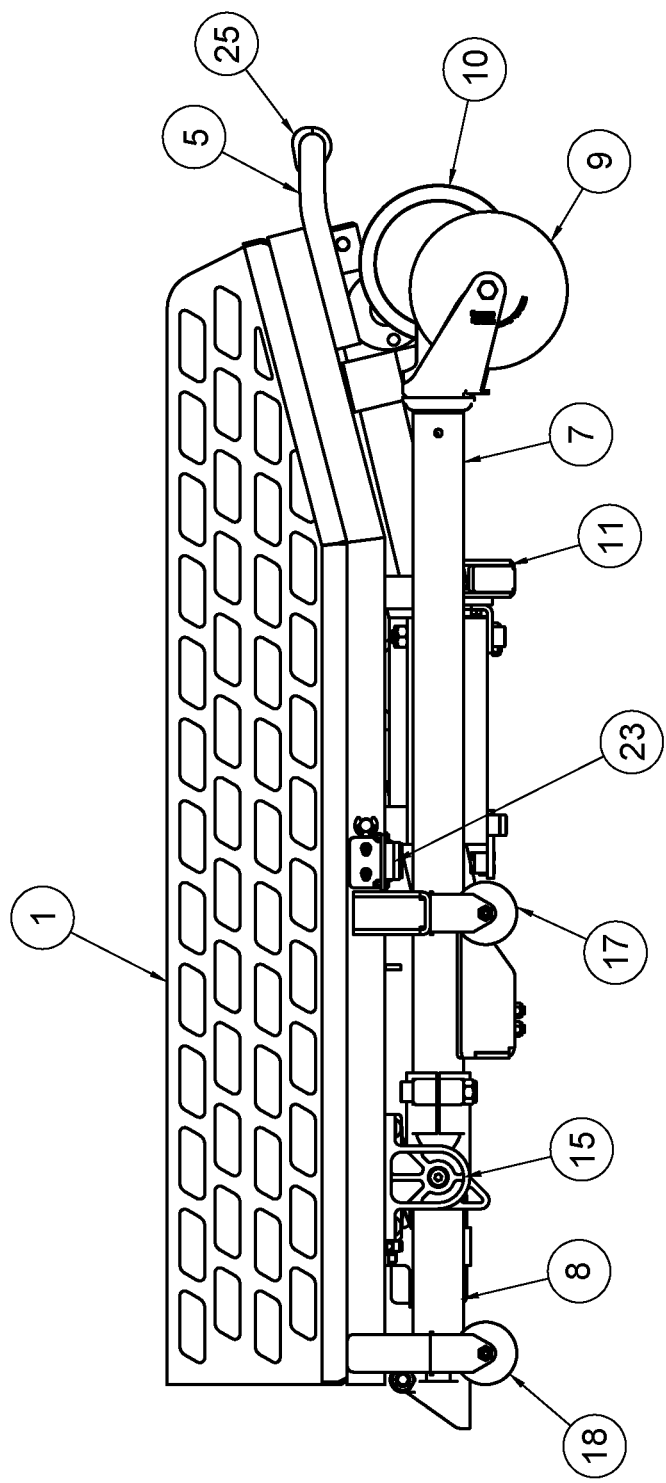
FIG. 5 is a side view of one embodiment of the present disclosure showing an extended version of the collapsible shopping cart.

Referring now to the drawings and the characters of reference marked thereon, FIGS. 1 to 5 show a basket 1 having a main storage compartment 2 with a front face 3 and a rear face 4 directly opposite of the front face 3 and distanced by the main storage compartment 2. A handle 5 is securely mounted to the rear face 4. The basket 1 of the present embodiment is preferably made of aluminum for its relatively light weight. However, in different embodiments, other suitable materials can be used to manufacture the basket 1 based on its structural strength or other requirements.

The collapsible shopping cart system also includes at least one hook and a means for compartmentalizing the main storage compartment (not depicted here). The material of the compartmentalizing means can be an elastic net, elastic mesh, or flexible and collapsible waterproof and thermally insulated material, all of which are washable.

As shown in these figures, the collapsible shopping cart system also includes a chassis 6 having a front plurality of legs 7, with attached front wheels 9, and a rear plurality of legs 8, with attached rear wheels 10. The rear plurality of legs 8 also includes a cross member 11 that strengthens the structural rigidity of the legs during operation. In addition, both pluralities of legs 7, 8 are telescoping, thereby allowing a user to adjust the height of the shopping cart system as required or desired. This is an especially useful feature when using the collapsible shopping cart system with a vehicle, because it allows a user to adjust the height based on the vehicle.

To convert from an extend condition to a collapsed condition, a front actuator 12 is attached to a mounting member 13, which is also attached to the plurality of front legs 7 and is attached to the underside of the basket 1 (a hole in the basket 1 is used to allow tool access to a mounting point for the front actuator 12 though this hole may be omitted without affecting the device's function). When the system in an extended condition, the front liner actuator 12 can be actuated to extend and move the mounting member 13 which in turn moves the front plurality of legs 7 to a collapsed condition. This actuation causes the front actuator 12 to collapse, which in turn moves the mounting member 13 to pull the front plurality of legs 7 toward the rear of the shopping cart system. However, due to a front hinge 15 coupled with one end of each front leg 7, the plurality of front legs 7 rotate about the hinge 15 and fold up against the underside of the basket 1. Further, an actuator hinge can be used to couple the front actuator 12 and the mounting member 13. Accordingly, any rotation of the front actuator 12, in addition to the linear movement, is transferred by the actuator hinge to pull the mount member 13 to move the front legs 7 between either a collapsed condition or an extended condition.

Similarly, the rear plurality of legs 8 is converted from an extended condition to a collapsed position by a rear actuator 14. To aid in the smooth collapsing motion of the rear plurality of legs 8, a bearing 19 is added to each rear leg 8. These bearings 19 are attached to a bearing frame rail 20, to which is also attached to one end of the rear actuator 14. The bearings 19 are also attached, at the other end, to a crossbar 21 that is attached to the chassis 6. The crossbar 21 allows the bearings 19 to rotatably couple with the chassis 6. This mounting configuration allows the bearings 19 to rotate toward the basket 1, while the plurality of rear legs 8 slide through the bearings 19 toward the front the cart system, thus collapsing the plurality of rear legs 8.

At the end of the rear plurality of legs 8 opposite the attached rear wheels 10, a guide bumper 16 is attached and it contacts the underside of the main storage compartment 2 to guide the rear legs 8 and prevent them from damaging the underside of the main storage compartment 2 or the chassis 6.

Once in a collapsed condition, the cart system rests on a set of front small wheels 18 and a set of midline small wheels 17. These small wheels 17, 18 are operable to rotate, thus allowing the cart system to be guided once collapsed. On the other hand, the rear of the cart system rests on the front attached wheels 9 and rear attached wheels 10.

In this embodiment, a front IR (infrared) sensor 22 and rear IR sensor 23 are used to automatically trigger the front and rear actuators 12, 14. Both IR sensors 22, 23 are located on the underside of the cart system, with the front IR sensor 22 being located on a cross rail 24 near the front end of the cart system. The rear IR sensor 23, is mounted on a bracket immediately to the rear of the midline small wheels 17. Notably, both sensors 22, 23 are in front of, or even with, the front of the plurality of legs 7, 8. This allows the sensors 22, 23 to be triggered and actuate the actuators 12, 14 before the plurality of legs 7, 8 contact another object.

In this configuration, which is particularly useful when loading the cart system into a vehicle, the front IR sensor 22 is triggered when it senses a surface under the front of the cart system. The front IR sensor 22 then signals the front actuator 12 to actuate, which in turn collapses the front plurality of legs 7. As the front plurality of legs 7 collapse, the load from the front of the cart system is transferred to the front small wheels 18, as they contact the surface. As is readily apparent, the telescoping feature of the plurality of legs 7, 8 is critical to the cart system smoothly transferring the weight to the surface. If the height is too high, the front of the cart system will drop precipitously before contacting the surface. This could unbalance a load and cause it to spill or otherwise be dropped.

As the cart system continues moving forward, the rear IR sensor 23 is triggered once it too senses the surface. The rear IR sensor 23, then signals the rear actuator 14 to actuate, which collapses the rear plurality of legs 8. As the rear plurality of legs 8 collapses, the load on the middle, and temporarily the rear, of the cart system is transferred to the midline small wheels 17.

Next, the forward motion of the cart system causes the front attached wheels 9 and rear attached wheels 10 to move over the surface and begin supporting the load on the rear of the cart. Thus, the cart system is in the fully collapsed condition and all weight is now supported by all the wheels 9, 10, 17, 18. These wheels 9, 10, 17, 18 allow a user to guide and control the cart to its final position, even in a collapsed condition.

Should a user wish to manually control the cart system, a user control 25 is located on the handle 5, in location convenient for the user. This user control 25 may be used to extend or collapse the cart as desired and is particularly useful as a backup to the IR sensors.

In another embodiment of the present application, the actuators 12, 14 will be set at a locked state when the legs 7, 8 are fully extended or fully collapsed. The actuators 12, 14 can be actuated to move the legs 7, 8 only when they are in an unlocked state and then also receive instruction from the user control 25. The front IR sensor 22 is triggered when it senses a surface under the front of the cart system. The front IR sensor 22 then switches the front actuator 12 to an unlocked state in order for the user to use the user control 25 to send the instruction to the front actuator 12 to actuate and move the front legs 7 to the collapsed position. Similarly, the rear IR sensor 23 is triggered when it senses too senses the surface. The rear IR sensor 23 then switches the rear actuator 14 to an unlocked state in order for the user to use the user control 25 to instruct the rear actuator 14 to actuate and move the rear legs 8 to the collapsed position.

In the embodiment described above, two separate instructions front the user control 25 are required for the actuators 12, 14 to move the corresponding legs 7, 8. However, in different embodiments, once the user control 25 instruct the front actuator 12 to actuate it can then also instruct the rear actuator 14 to actuate after a delayed moment. Thus, the user only needs to use the user control 25 once to move the legs 7, 8 to an extended position or to an collapsed position.

A power supply 26, typically in the form of a battery or capacitor that is rechargeable, is attached the cross rail 24 and is the power source for the actuators 12, 14, IR sensors 22, 23, user controls 25, and a CPU (Central Processing Unit). The CPU (not shown) is operable to control the actuators 12, 14 and transmit any signals from the IR sensors 22, 23 or user controls 25 to the actuators 12, 14 and may be of any type of controller operable to control the system, like an Arduino board, a PLC, or the like. The CPU may be located in any appropriate location, such as the user controls 25 or near the power source 26.

In these and other embodiments, the actuators 12, 14 may be mechanically driven, like ACME Score style actuators (like those shown), electrically driven, or pneumatically driven. Also, in the embodiments described above, the sensors 22, 23 are IR (infrared) sensors. However, other sensors known in the art for sensing distance such as ultrasonic sensors or others can also be used.

In addition, the wheels may be of any size convenient to their function and composed of any material that provides adequate support and shock absorption, like plastic, rubber, or polyurethane. The wheels are preferably made of rubber. However, in different embodiments, the wheels can be made of other materials depending on their structural strength, frictions coefficients, or other requirements known in the art.

In these and other embodiments, the cart system includes a compartment in the basket 1 adapted to structurally receive a baby seat in the basket (not depicted here). The user can easily secure the baby seat by utilizing coupling means such as snapping, sliding, or using polyester or nylon seatbelt webbing to strap the baby seat into place.

In another embodiment, the collapsible shopping cart system further includes a lightweight, waterproof, washable removable cover to protect the collapsible shopping cart from damage in transport and between uses. The removable cover features luggage straps and a set of wheels at the base of the removable cover for ease of transporting the collapsible shopping cart while within the removable cover.

The cart system may also include a set of brakes to prevent the cart system from moving unintentionally, either while collapsed in a vehicle or while be used in an extended condition.

The present disclosure is also embodied in a method of using a collapsible shopping cart system, including the steps of obtaining the cart system, converting the cart system to an extended condition, gripping the system by the handle 5, moving the cart system, placing items into the basket 1 of the cart system, rolling the system to a user's vehicle, adjusting the cart system legs (this may be done at any time), and pushing the cart system into the vehicle's cargo area, thereby activating a first plurality of legs 7 to collapse and transfer load to a first set of wheels 18 to begin to roll the collapsible shopping cart into the vehicle, then once a second plurality of legs 8 reaches the cargo area, the second plurality of legs 8 is activated to collapse and transfer load to a second set of wheels 17 until the cart system is fully in the cargo area and the load is shared by all wheels. The method further includes the step of activating a set of brakes on the first set of wheels 9 to ensure that the cart does not roll inside the vehicle.

As mentioned above, other embodiments and configurations may be devised without departing from the spirit of the invention and the scope of the appended claims. In the foregoing description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The foregoing detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

The invention claimed is:

1. A collapsible cart system, comprising:
 a container having a front end and a back end;
 a chassis coupled with a bottom of the container;
 a first leg having a first end movable relative to the chassis and a second end;
 a first wheel coupled with the second end of the first leg;
 a first actuator connected to the chassis and the first leg, wherein the first actuator is configured to move the first leg relative to the chassis to alternate between a first position where the second end the first leg is fully extended away from the chassis and a second position where the first leg is substantially parallel with a bottom of the chassis;
 a power supply electrically coupled with the first actuator, the first actuator draws power from the power supply to move the first leg between the first position and the second position; and
 a first sensor disposed on the chassis and below the container, the first sensor being electrically coupled with the first actuator, wherein the first sensor is configured to detect a distance between the first sensor and a surface below the first sensor, the first sensor instructs the first actuator to move the first leg from the first position to the second position when the distance detected is less than a set value.

2. The collapsible cart system of claim 1, further comprising:
 an unlocking sensor disposed on the chassis and below the container, the unlocking sensor being electrically coupled with the first actuator, the first actuator being in a locked status when the first leg is in the first position and unable to move the first leg, wherein the unlocking sensor is configured to detect a distance between the unlocking sensor and a surface below the unlocking sensor, the unlocking sensor switches the first actuator to an unlocked state when the distance detected is less than a set value.

3. The collapsible cart system of claim 1, further comprising: a user control electrically coupled with the first actuator, where a user manually uses the user control to instruct the first actuator to move the first leg between the first position and the second position.

4. The collapsible cart system of claim 1, wherein the first actuator includes:
a first mounting member coupled with the first leg; and
a first actuating member connected to the chassis and movably coupled with the first mounting member, the first actuating member is configured to move the first mounting member which in turn moves the first leg between the first position and the second position.

5. The collapsible cart system of claim 1, wherein the chassis includes a hinge movably coupled with the first end of the first leg, the first leg rotates about the hinge when moved by the first actuator between the first position and the second position.

6. The collapsible cart system of claim 1, further comprising:
a second leg having a third end movable relative to the chassis and a fourth end;
a second wheel coupled with the fourth end of the second leg; and
a second actuator connected to the chassis and the second leg, wherein the second actuator is configured to move the second leg relative to the chassis to alternate between a third position where the fourth end of the second leg is fully extended away from the chassis and a fourth position where the second leg is substantially parallel with a bottom of the chassis,
the first leg in the position is closer to the front end of the container than the second leg in the third position.

7. The collapsible cart system of claim 6, wherein the second actuator includes:
a second mounting member rotatably coupled with the chassis and configured to receive the second leg; and
a second actuating member connected to the chassis and movably coupled with the second mounting member, wherein the second actuating member moves and rotates the second mounting member which in turn moves the second leg between the third position and the fourth position, at least a part of the second leg slidably moves within the second mounting member, the third end of the second leg contacting the chassis when the second leg is moved from the fourth position to the third position.

8. An automated collapsible cart system, comprising;
a container having a front end and a back end;
a chassis coupled with a bottom of the container;
at least one first leg having a first end movable relative to the chassis and a second end;
at least one first wheel coupled with the second end of the first leg;
a first actuator connected to the chassis and the first leg, wherein the first actuator is configured to move the first leg relative to the chassis to alternate between a first position where the second end of the first leg is fully extended away from the chassis and a second position where the first leg is substantially parallel with a bottom of the chassis; and
a first sensor disposed on the chassis and below the container, the first sensor being electrically coupled with the first actuator, wherein the first sensor is configured to detect a distance between the first sensor and a surface below the first sensor, the first sensor instructs the first actuator to move the first leg from the first position to the second position when the distance detected is less than a set value.

9. The automated collapsible cart system of claim 8, further comprising:
a second leg having a third end movable relative to the chassis and a fourth end;
a second wheel coupled with the fourth end of the second leg;
a second actuator connected to the chassis and the second leg, wherein the second actuator is configured to move the second leg relative to the chassis to alternate between a third position where the fourth end of the second leg is fully extended away from the chassis and a fourth position where the second leg is substantially parallel with a bottom of the chassis, the first leg in the position is closer to the front end of the container than the second leg in the third position; and
a second sensor disposed on the chassis and below the container, the second sensor being closer to the back end than the first sensor, wherein the second sensor is electrically coupled with the second actuator and configured to detect a distance between the second sensor and a surface below the second sensor, the second sensor instructs the second actuator to move the second leg from the third position to the fourth position when the distance detected is less than a set value.

10. The automated collapsible cart system of claim 8, wherein the at least one first leg moves telescopically.

11. The automated collapsible cart system of claim 8, wherein the first actuator comprises: a first mounting member coupled with the first leg; and
a first actuating member connected to the chassis and movably coupled with the first mounting member, the first actuating member is configured to move the first mounting member which in turn moves the first leg between the first position and the second position.

12. The automated collapsible cart system of claim 8, wherein the first actuating member moving the first mounting member moves the second end of the first leg toward a rear of the chassis.

13. The automated collapsible cart system of claim 9, wherein the second leg moves telescopically.

14. The automated collapsible cart system of claim 9, further comprising:
a plurality of bearings connected to the second actuator and rotatably connected to the chassis, the second leg slides through the plurality of bearings toward a front of the chassis.

15. A method of manufacturing a collapsible cart system, comprising the steps of:
providing a container having a front end and a back end;
coupling a chassis with a bottom of the container;
connecting a first actuator to the chassis;
coupling the first actuator with a first leg having a first end movable relative to the chassis and a second end;
coupling a wheel to the second end of the first leg;
configuring the first actuator to move the first leg relative to the chassis to alternate between a first position where the second end the first leg is fully extended away from the chassis and a second position where the first leg is substantially parallel with a bottom of the chassis;
electrically coupling a power supply to the first actuator;
configuring the first actuator to draw power from the power supply to move the first leg between the first position and the second position;
disposing at least one first sensor on the chassis and below the container;

electrically coupling the first sensor with the first actuator; and configuring the first sensor to detect a distance between the first sensor and a surface below the first sensor, wherein the first sensor instructs the first actuator to move the first leg from the first position to the second position when the distance detected is less than a set value.

16. The manufacture method of claim 15, further comprising the steps of:

disposing at least one unlocking sensor on the chassis and below the container;

electrically coupling the unlocking sensor with the first actuator, wherein the first actuator being in a locked status when the first leg is in the first position and unable to move the first leg; and configuring the unlocking sensor to detect a distance between the unlocking sensor and a surface below the unlocking sensor, wherein the unlocking sensor switches the first actuator to an unlocked state when the distance detected is less than a set value.

\* \* \* \* \*